(12) United States Patent
Li et al.

(10) Patent No.: US 11,372,133 B2
(45) Date of Patent: Jun. 28, 2022

(54) ADVECTION FOG FORECASTING SYSTEM AND FORECASTING METHOD

(71) Applicants: XIAMEN KIRINCORE IOT TECHNOLOGY LTD., Fujian (CN); FUJIAN ATMOSPHERIC DETECTION TECHNOLOGY SUPPORT CENTER, Fujian (CN)

(72) Inventors: Xiaodong Li, Fuzhou (CN); Hongwei Zhou, Xiamen (CN); Yong Ren, Fuzhou (CN); Yunfeng Peng, Fuzhou (CN)

(73) Assignees: XIAMEN KIRINCORE IOT TECHNOLOGY LTD., Fujian (CN); FUJIAN ATMOSPHERIC DETECTION TECHNOLOGY SUPPORT CENTER, Fujian (CN)

( * ) Notice: Subject to any disclaimer, the term of this patent is extended or adjusted under 35 U.S.C. 154(b) by 0 days.

(21) Appl. No.: 17/263,903

(22) PCT Filed: Mar. 3, 2020

(86) PCT No.: PCT/CN2020/077567
§ 371 (c)(1),
(2) Date: Jan. 28, 2021

(87) PCT Pub. No.: WO2020/192367
PCT Pub. Date: Oct. 1, 2020

(65) Prior Publication Data
US 2021/0325566 A1    Oct. 21, 2021

(30) Foreign Application Priority Data

Mar. 28, 2019 (CN) .......................... 201910244323.8

(51) Int. Cl.
*G01W 1/10* (2006.01)
*H04B 17/318* (2015.01)
*G01W 1/02* (2006.01)

(52) U.S. Cl.
CPC ................ *G01W 1/10* (2013.01); *G01W 1/02* (2013.01); *H04B 17/318* (2015.01); *G01W 2203/00* (2013.01)

(58) Field of Classification Search
CPC ..... G01W 1/10; G01W 1/02; G01W 2203/00; H04B 17/318
See application file for complete search history.

(56) References Cited

U.S. PATENT DOCUMENTS

2019/0340940 A1* 11/2019 Elkabetz .............. G08G 5/0065

FOREIGN PATENT DOCUMENTS

| CN | 102540277 A | * | 7/2012 |
| CN | 106950614 A | * | 7/2017 |

(Continued)

*Primary Examiner* — Daniel R Miller
*Assistant Examiner* — Christian T Bryant
(74) *Attorney, Agent, or Firm* — Leong C. Lei (57) ABSTRACT

An advection fog forecasting system and a method thereof are based on the recognition that wireless signal communication is subject to weather conditions. The system and the method involve collecting radio signals in a forecasting region that is likely to be shrouded in fog. Radio signals influenced by fog can show fog attenuation, and different levels of attenuation can be represented by different values of a radio signal strength indicator RSSI. With the variation curve of the radio signal strength indicator RSSI and weather variables, such as the humidity, the wind speed and the rainfall in the forecasting region, forecasting advection fog can be achieved.

2 Claims, 5 Drawing Sheets

(56) References Cited

FOREIGN PATENT DOCUMENTS

| | | | | | |
|---|---|---|---|---|---|
| CN | 108107486 | A | * | 6/2018 | |
| CN | 111785094 | A | * | 10/2020 | ........... G08G 5/0091 |
| CN | 112633595 | A | * | 4/2021 | .............. G01W 1/14 |
| JP | 2014202609 | A | * | 10/2014 | |
| KR | 100946386 | B1 | * | 3/2010 | |

* cited by examiner

ADVECTION FOG FORECASTING SYSTEM AND FORECASTING METHOD

BACKGROUND OF THE INVENTION

1. Technical Field

The present invention relates to weather applications, and more particularly to an advection fog forecasting system and its forecasting method.

2. Description of Related Art

Advection fog is a kind of fog forming when moist, warm air flow onto a colder, lower surface and the lower part of the air thus gets cooled. Advection fog often has features such as high suddenness, broad coverage, high strength, and long lasting, making it a great threat to road traffic and marine traffic.

Conventionally, forecasting advection fog is mainly achieved using measuring devices, such as laser radars and visibility sensors. A laser radar has a relatively low working range, only 8-10 km, and is suitable for short-distance observation. As advection fog can cover a region up to hundreds of kilometers, the conventional approach cannot provide effective measurement and forecast of advection fog unless an ample number of laser radars or visibility sensors are deployed. However, such a high-density deployment means increased forecast costs. Additionally, it is impractical to deploy laser radars or visibility sensors over vast oceans.

In view of this, the inventor of the present invention has made efforts to overcome the shortcomings of the existing approaches to forecasting advection fog, and eventually devised the present invention.

SUMMARY OF THE INVENTION

To improve the prior art, the objective of the present invention is to provide an advection fog forecasting system that has broad measurement coverage and low measurement costs as well as a forecasting method thereof.

To achieve the foregoing objective, the present invention implements the following technical schemes:

An advection fog forecasting system comprises two or more LoRa base stations, a weather data port for receiving weather data, and a data analysis server;

the LoRa base stations each being configured to transmit and receive radio signals, to collect a strength indicator $RSSI_1$ of the actually received radio signal, and to transmit the radio signal strength indicator $RSSI_1$ to the data analysis server, wherein the LoRa base stations are built in a forecasting region, and a distance between two adjacent said LoRa base stations is of 5-100 km;

the weather data port being configured to receive weather data collected in the forecasting region, and to transmit the weather data to the data analysis server, wherein the weather data include a humidity, a wind speed and a rainfall; and the data analysis server being configured to determine an advection fog state between two said LoRa base stations according to the received weather data and the radio signal strength indicator $RSSI_1$ of the radio signal transmitted and received between the two LoRa base stations, wherein when the $RSSI_1$ is smaller than a forecasting threshold $RSSI_0$ and there is no rain in the forecasting region, it is determined that advection fog is present in an area of the forecasting region defined between two said LoRa base stations, and an advection fog density is to be obtained;

in which the advection fog density is obtained using an equation of:

$$W = \{\overline{R} \cap (RSSI_1 - RSSI_0)\}$$

where, R is the rainfall, and when $R \neq 0$, the advection fog density is 0; and when $R = 0$, the advection fog density is W, or a difference between $RSSI_1$ and $RSSI_0$;

in which the forecasting threshold is determined using an evaluation model that $RSSI_0 = \alpha + \text{Log}_{based}d - \text{Log}_{basex}X - \text{Log}_{basey}Y$ where $\alpha$ is an RSSI signal distance adjustment parameter; d is the distance between two said LoRa base stations; based is a base for a logarithm of the distance between the LoRa base stations in the forecasting region; basex is a base for a logarithm of an adjustment factor for the humidity in the forecasting region; X is a value of the humidity in the forecasting region, basey is a base for a logarithm of an adjustment factor for the wind speed in the forecasting region; and Y is a value of the wind speed in the forecasting region.

An advection fog forecasting method comprises the following steps:

Step 1. providing two or more LoRa base stations in a forecasting region where advection fog forecast is required, wherein a distance between two adjacent said LoRa base stations is of 5-100 km; and acquiring weather data in the forecasting region by means of a weather data port;

Step 2. making the LoRa base stations collect a radio signal strength $RSSI_1$ of a radio signal transmitted therebetween and transmit the radio signal strength $RSSI_1$ to a data analysis server, and making the weather data port acquire a humidity, a wind speed, and a rainfall as the weather data, and transmit the weather data to the data analysis server; accumulating the radio signal strength $RSSI_1$ and the weather data for more than 30 days as an accumulated dataset, and when there are 5-8 times of presence of advection fog in the forecasting region, analyzing the accumulated dataset, in order to determine parameters including $\alpha$, based, basex, and basey for an evaluation model of a forecasting threshold $RSSI_0$, thereby determining the evaluation model of $RSSI_0$;

in which the evaluation model of the forecasting threshold $RSSI_0$ is determined according to $RSSI_1$, the weather data and the presence of advection fog, and is represented as:

$$RSSI_0 = \alpha + \text{Log}_{based}d - \text{Log}_{basex}X - \text{Log}_{basey}Y$$

where $\alpha$ is an RSSI signal distance adjustment parameter;

d is the distance between two said LoRa base stations;

based is a base for a logarithm of the distance between the LoRa base stations in the forecasting region; basex is a base for a logarithm of an adjustment factor for the humidity in the forecasting region;

X is a value of the humidity in the forecasting region;

basey is a base for a logarithm of an adjustment factor for the wind speed in the forecasting region; and Y is a value of the wind speed in the forecasting region; and Step 3. forecasting advection fog;

making the LoRa base stations acquiring the radio signal strength $RSSI_1$ of the actually received radio signal, and transmit the weather data to the data analysis server; and making the weather data port acquire the humidity, the wind speed, and the rainfall in the forecasting region, and transmit the weather data to the data analysis server;

according to the radio signal strength $RSSI_1$ of the actually received radio signal, the weather data and the forecasting threshold $RSSI_0$, obtaining an advection fog density using an equation of:

$$W=\{\overline{R} \cap RSSI_1 - RSSI_0)\}$$

where, R is the rainfall, and when R≠0, the advection fog density is 0;

when R=0, the advection fog density is W, or a difference between $RSSI_1$ and $RSSI_0$; and when a value of the rainfall is equal to 0 and $RSSI_1$ is smaller than $RSSI_0$, determining that advection fog is present in an area of the forecasting region defined between two said LoRa base stations with the advection fog density being of W.

With the foregoing schemes, the present invention is based on the recognition that wireless signal communication is subject to weather conditions. The system and the method involve collecting radio signals in a forecasting region that is likely to be shrouded in fog. Radio signals influenced by fog can show fog attenuation, and different levels of attenuation can be represented by different values of a radio signal strength indicator RSSI. With the variation curve of the radio signal strength indicator RSSI and weather variables, such as the humidity, the wind speed and the rainfall in the forecasting region, forecasting advection fog can be achieved. Additionally, since the present invention uses LoRa base stations that can transmit and receive radio signals over a long distance for forecasting advection fog, in a given measurement range, the required number of LoRa base stations is small than that of the laser radars or visibility sensors, thereby reducing the costs for forecasting advection fog. To sum up, the present invention can effectively forecast advection fog in a certain region with broad coverage and low costs.

DETAILED DESCRIPTION OF THE INVENTION

Figure 1:
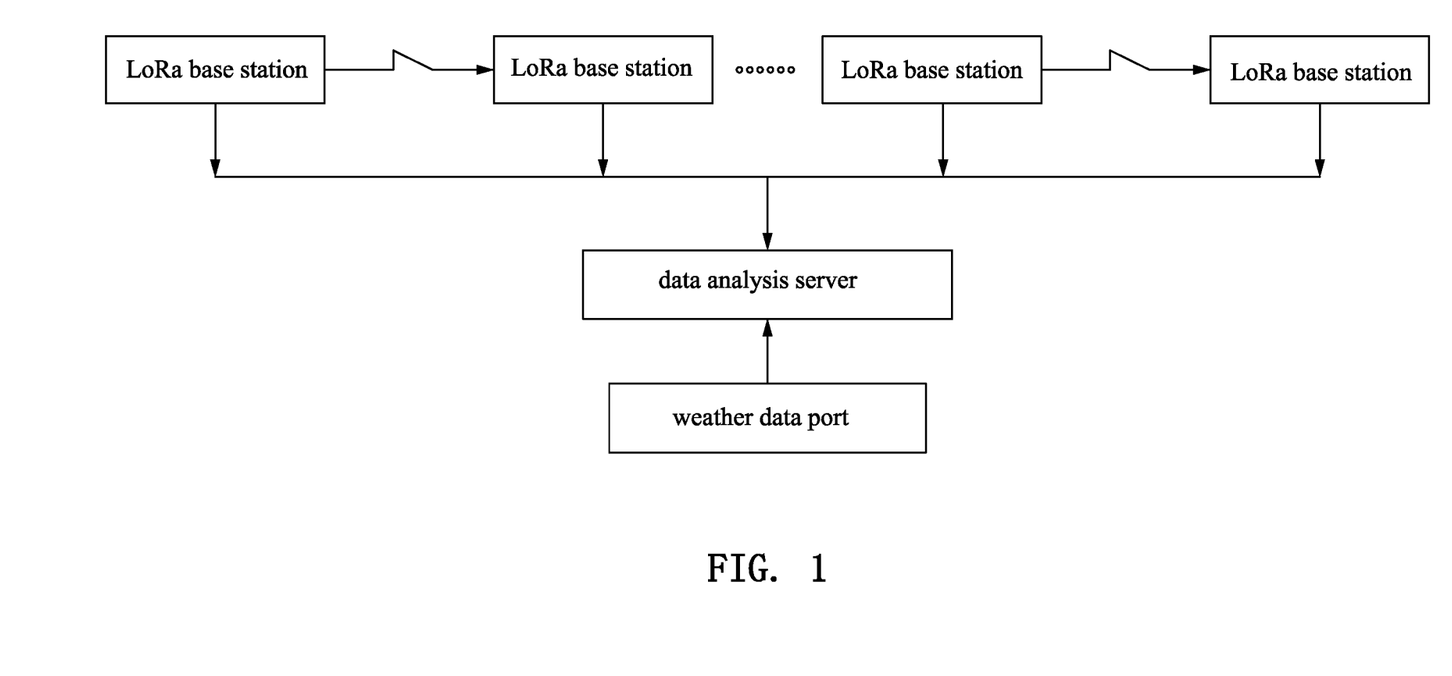
FIG. 1 is a principle block diagram of an advection fog forecasting system of the present invention.
Figure 2:
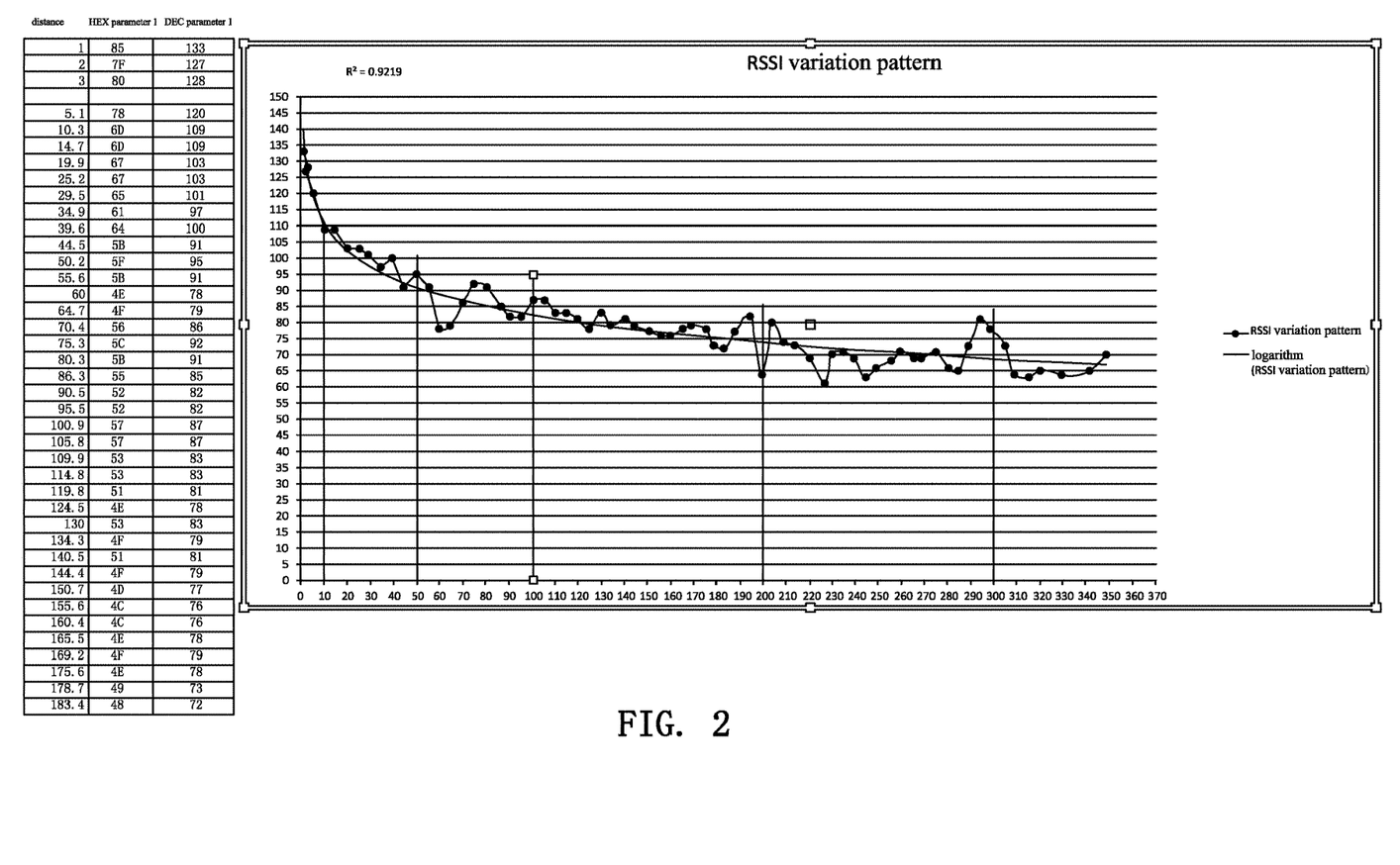
FIG. 2 is a graph showing a variation pattern of an RSSI.

As shown in FIG. 1, the present invention discloses an advection fog forecasting system, which comprises two or more LoRa base stations, a weather data port, and a data analysis server.

The LoRa base station is configured to transmit and receive radio signals, to collect a strength indicator $RSSI_1$ of the radio signal it actually receives, and to transmit the radio signal strength indicator $RSSI_1$ to the data analysis server. The LoRa base stations are built in a forecasting region, and a distance between two adjacent said LoRa base stations is 5-100 km.

The weather data port is configured to receive weather data collected in the forecasting region, and to transmit the weather data to the data analysis server. The weather data include humidity, wind speed and rainfall.

The data analysis server, according to the received weather data and the strength indicator $RSSI_1$ of the radio signal transmitted and received between two said LoRa base stations, determines an advection fog state between the two LoRa base stations. When $RSSI_1$ is smaller than forecasting threshold $RSSI_0$ and there is no rain in the forecasting region, it is determined that advection fog is present in an area of the forecasting region defined between two said LoRa base stations, and an advection fog density is to be obtained;

in which the advection fog density is obtained using an equation of:

$$W=\{\overline{R} \cap (RSSI_1 - RSSI_0)\}$$

where, R is the rainfall, and when R≠0, the advection fog density is 0;

when R=0, the advection fog density is W, or a difference between $RSSI_1$ and $RSSI_0$.

The forecasting threshold is determined using an evaluation model that $$RSSI_0 = \alpha + Log_{based}d - Log_{basex}X - Log_{basey}Y;$$

where α is an RSSI signal distance adjustment parameter; d is the distance between two said LoRa base stations; based is a base for a logarithm of the distance between the LoRa base stations in the forecasting region; basex is a base for a logarithm of an adjustment factor for the humidity in the forecasting region; X is a value of the humidity in the forecasting region, basey is a base for a logarithm of an adjustment factor for the wind speed in the forecasting region; and Y is a value of the wind speed in the forecasting region.

Based on the advection fog forecasting system described previously, the present invention further discloses an advection fog forecasting method, which comprises the following steps:

Step 1. providing two or more LoRa base stations in a forecasting region where advection fog forecast is required, wherein a distance between two adjacent said LoRa base stations is of 5-100 km; and acquiring weather data in the forecasting region by means of a weather data port;

Step 2. making the LoRa base stations collect a radio signal strength $RSSI_1$ of a radio signal transmitted therebetween and transmit the radio signal strength $RSSI_1$ to a data analysis server, and making the weather data port acquire a humidity, a wind speed, and a rainfall as the weather data, and transmit the weather data to the data analysis server; accumulating the radio signal strength $RSSI_1$ and the weather data for more than 30 days as an accumulated dataset, and when there are 5-8 times of presence of advection fog in the forecasting region, analyzing the accumulated dataset, in order to determine parameters including α, based, basex, and basey for an evaluation model of a forecasting threshold $RSSI_0$, thereby determining the evaluation model of $RSSI_0$;

in which the evaluation model of the forecasting threshold $RSSI_0$ is determined according to $RSSI_1$, the weather data and the presence of advection fog, and is represented as:

$$RSSI_0 = \alpha + Log_{based}d - Log_{basex}X - Log_{basey}Y$$

in which the evaluation model of the forecasting threshold $RSSI_0$ is determined according to $RSSI_1$, the weather data and the presence of advection fog, and is represented as:

Step 3. forecasting advection fog;

making the LoRa base stations acquiring the radio signal strength $RSSI_1$ of the actually received radio signal, and transmit the weather data to the data analysis server; and making the weather data port acquire the humidity, the wind speed, and the rainfall in the forecasting region, and transmit the weather data to the data analysis server;

according to the radio signal strength $RSSI_1$ of the actually received radio signal, the weather data and the forecasting threshold $RSSI_0$, obtaining an advection fog density using an equation of:

$$W=\{\overline{R} \cap (RSSI_1 - RSSI_0)\}$$

where, R is the rainfall, and when R≠0, the advection fog density is 0;

when R=0, the advection fog density is W, or a difference between $RSSI_1$ and $RSSI_0$; and when a value of the rainfall is equal to 0 and $RSSI_1$ is smaller than $RSSI_0$, determining that advection fog is present in an area of the forecasting region defined between two said LoRa base stations with the advection fog density being of W.

The present invention is based on the recognition that wireless signal communication is subject to weather conditions. The system and the method involve collecting radio signals in a forecasting region that is likely to be shrouded in fog. Radio signals influenced by fog can show fog attenuation, and different levels of attenuation can be represented by different values of a radio signal strength indicator RSSI. With the variation curve of the radio signal strength indicator RSSI and weather variables, such as the humidity, the wind speed and the rainfall in the forecasting region, forecasting advection fog can be achieved. Additionally, since the present invention uses LoRa base stations that can transmit and receive radio signals over a long distance for forecasting advection fog, in a given measurement range, the required number of LoRa base stations is small than that of the laser radars or visibility sensors, thereby reducing the costs for forecasting advection fog.

In an exemplary scenario of advection fog forecasting, two LoRa base stations may be deployed to forecast the advection fog in an area defined therebetween. Alternatively, three or more than three LoRa base stations may be deployed to provide advection fog forecasting in a larger region. An embodiment will be described below to further explain the present invention. In this embodiment, five LoRa base stations are deployed across a forecasting region.

Figure 3:
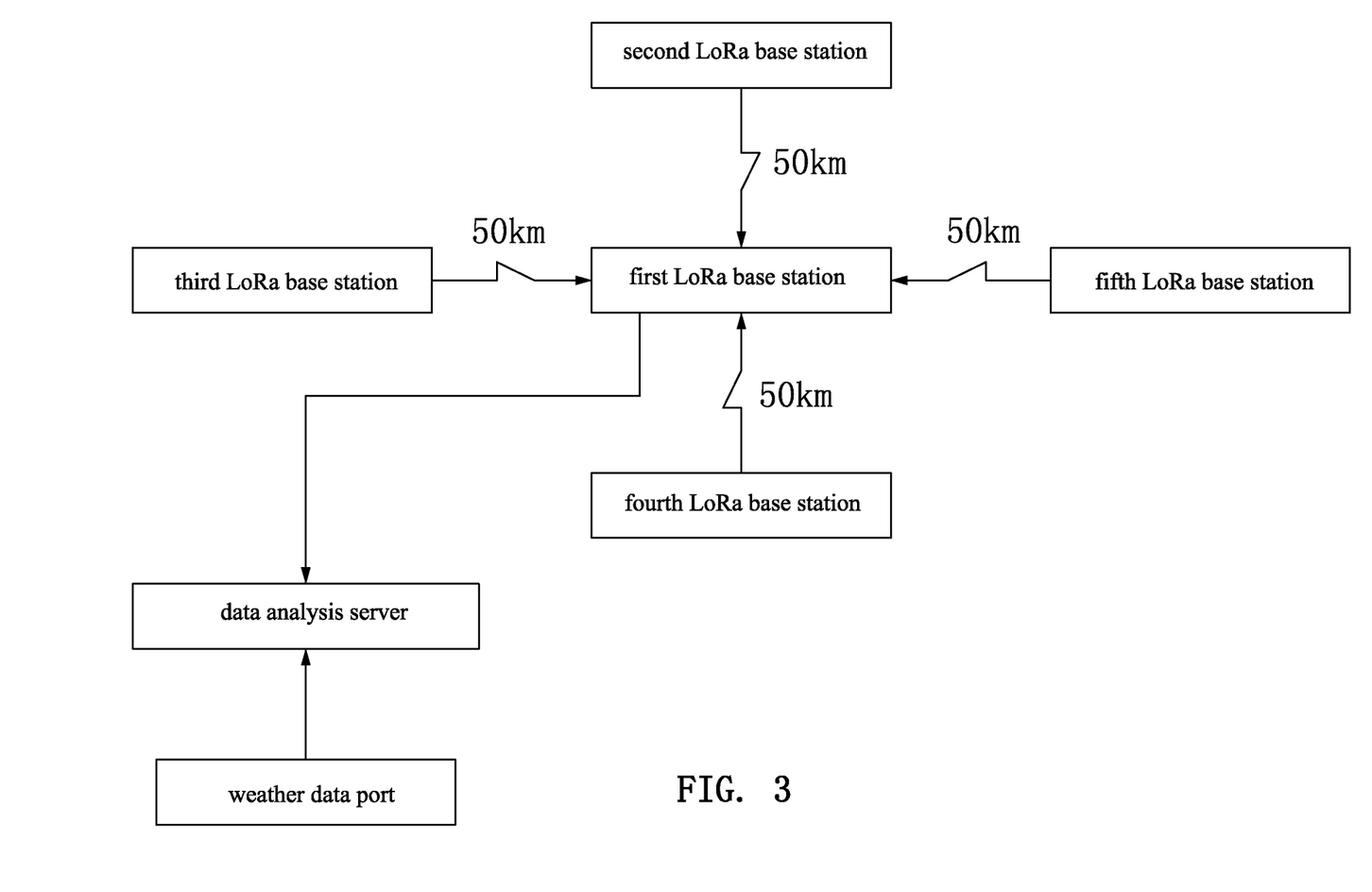
FIG. 3 is a principle block diagram of an advection fog forecasting system according to a first embodiment of the present invention.

As shown in FIG. 3, the five LoRa base stations are the first LoRa base station, the second LoRa base station, the third LoRa base station, the fourth LoRa base station, and the fifth LoRa base station. Therein, the second LoRa base station, the third LoRa base station, the fourth LoRa base station, and the fifth LoRa base station are located at the east, the south, the west, and the north to the first LoRa base station, respectively, each with a distance from the first LoRa base station being of 50 km. The second LoRa base station, the third LoRa base station, the fourth LoRa base station, and the fifth LoRa base station are configured to transmit radio signals, while the first LoRa base station is configured to receive radio signals. In addition, the first LoRa base station is connected to the data analysis server, which is meanwhile connected to the weather data port.

For forecasting advection fog, the second LoRa base station, the third LoRa base station, the fourth LoRa base station, and the fifth LoRa base station transmit radio signals. Each of the radio signals carries a corresponding LoRa base station ID. The first LoRa base station receives the radio signals from any of the other four LoRa base stations and acquires the corresponding radio signal strength indicators $RSSI_{12}$, $RSSI_{13}$, $RSSI_{14}$, and $RSSI_{15}$. Therein, $RSSI_{12}$ is the actually received radio signal strength indicator transmitted by the second LoRa base station. $RSSI_{13}$ is the actually received radio signal strength indicator transmitted by the third LoRa base station. $RSSI_{14}$ is the actually received radio signal strength indicator transmitted by the fourth LoRa base station. $RSSI_{15}$ is the actually received radio signal strength indicator transmitted by the fifth LoRa base station. The first LoRa base station then sends the acquired radio signal strength indicators $RSSI_{12}$, $RSSI_{13}$, $RSSI_{14}$, and $RSSI_{15}$ to the data analysis server.

Meanwhile, the weather data port is used to acquire real-time weather observation information in the forecasting region, including the humidity, the wind speed and the rainfall, and to transmit the humidity, the wind speed and the rainfall to the data analysis server. The data analysis server according to this weather observation information and the radio signal strength indicator of the radio signal transmitted and received between two said LoRa base stations acquires forecasting thresholds $RSSI_{02}$, $RSSI_{03}$, $RSSI_{04}$, and $RSSI_{05}$ between the first LoRa base station and each of the other LoRa base stations.

Afterward, by comparing the radio signal strength $RSSI_{12}$ to the forecasting threshold $RSSI_{02}$, it can be determined whether there is fog between the first LoRa base station and the second LoRa base station. By comparing the radio signal strength $RSSI_{13}$ to the forecasting threshold $RSSI_{03}$, it can be determined whether there is fog between the first LoRa base station and the third LoRa base station. By comparing the radio signal strength $RSSI_{14}$ to the forecasting threshold $RSSI_{04}$, it can be determined whether there is fog between the first LoRa base station and the fourth LoRa base station. By comparing the radio signal strength $RSSI_{15}$ to the forecasting threshold $RSSI_{05}$, it can be determined whether there is fog between the first LoRa base station and the fifth LoRa base station. If it has been determined that there is fog between the first LoRa base station and all the other four LoRa base stations, it is determined that the region covered by the five LoRa base stations is shrouded in fog.

Figure 4:
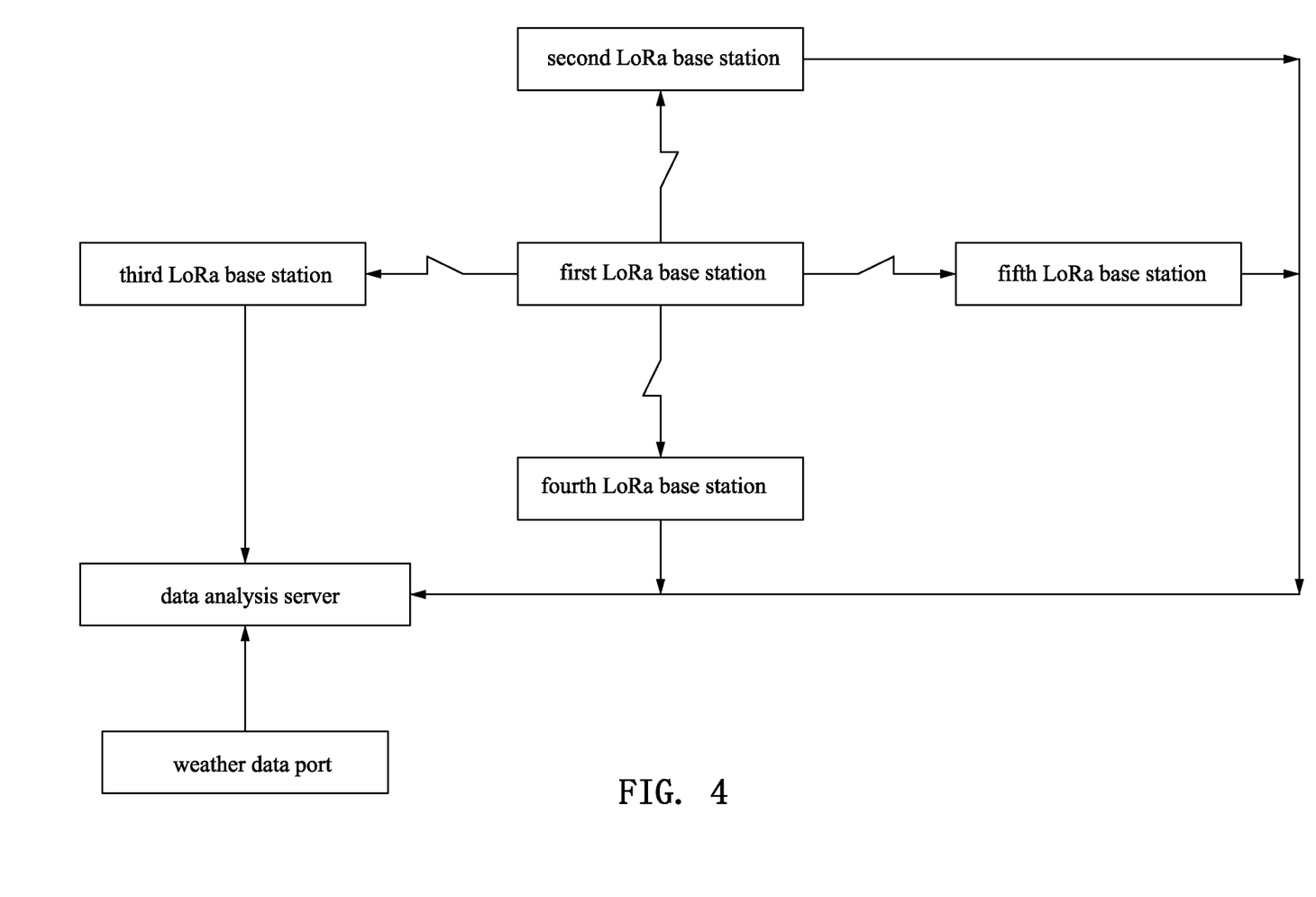
FIG. 4 is a principle block diagram of an advection fog forecasting system according to a second embodiment of the present invention.
Figure 5:
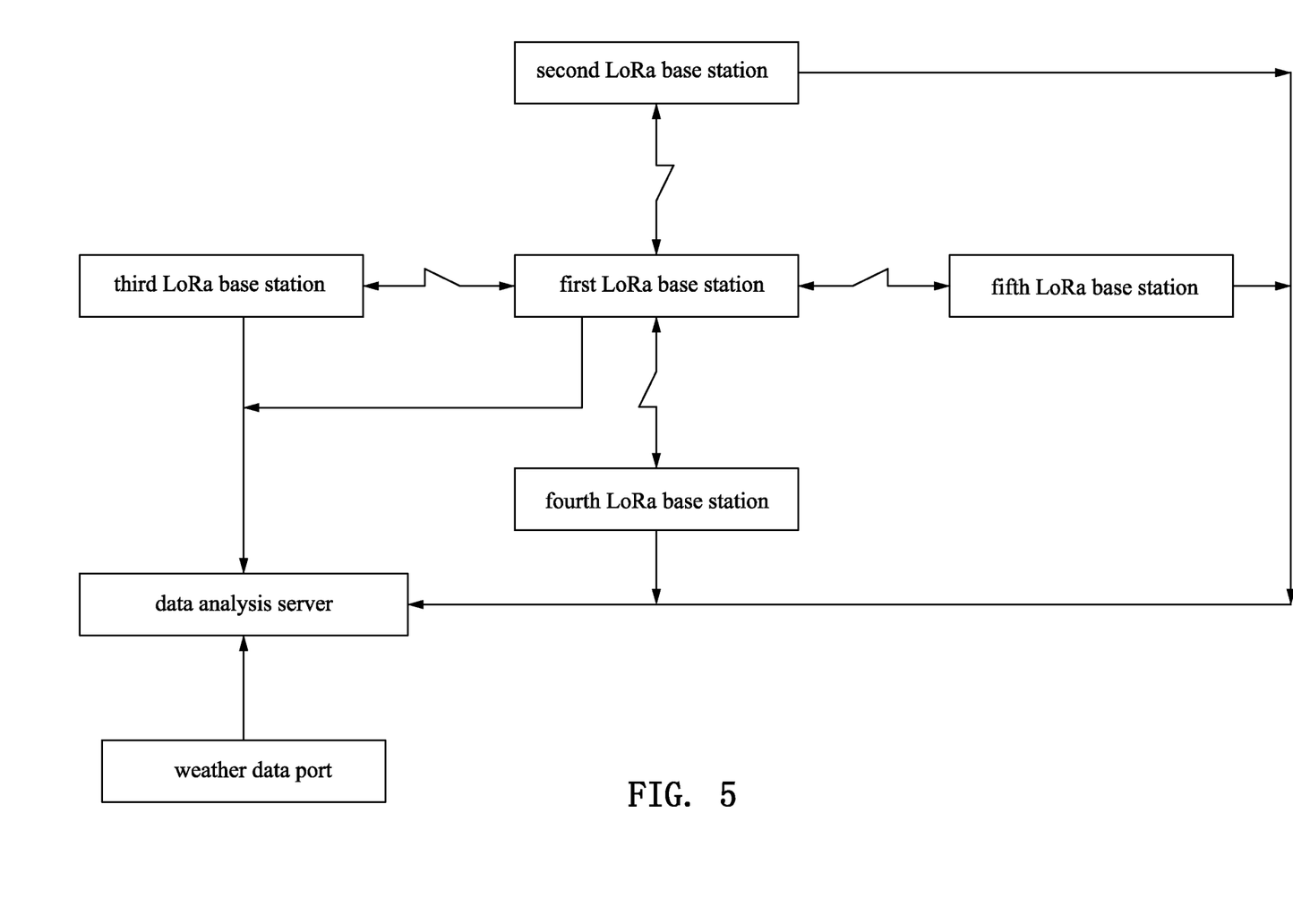
FIG. 5 is a principle block diagram of an advection fog forecasting system according to a third embodiment of the present invention.

In the foregoing embodiment, the second through fifth LoRa base stations are configured to transmit radio signals and the first LoRa base station is configured to receive radio signals. Alternatively, in another scenario of advection fog forecasting, the second through fifth LoRa base stations may be configured to receive radio signal, while the first LoRa base station is configured to transmit radio signal, as shown in FIG. 4. In this case, the second through fifth LoRa base stations are connected to the data analysis server. By acquiring the radio signal strength of signals received by the second through fifth LoRa base stations, forecasting of advection fog can be also achieved. Of course, as shown in FIG. 5, the first through fifth LoRa base stations may be alternatively configured to both transmit and receive radio signals. In this case, the five LoRa base stations are all connected to the data analysis server, and the advection fog state between any two LoRa base stations can be obtained, and the resulting forecasting of advection fog forecasting is expected to be more accurate.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. An advection fog forecasting system, comprising two or more long range wireless base stations, a weather data port for receiving weather data, and a data analysis server;

the long range wireless base stations each being configured to transmit and receive radio signals, to collect a strength indicator $RSSI_1$ of the actually received radio signal, and to transmit the radio signal strength indicator $RSSI_1$ to the data analysis server, wherein the long range wireless base stations are built in a forecasting region, and a distance between two adjacent said long range wireless base stations is of 5-100 km;

the weather data port being configured to receive weather data collected in the forecasting region, and to transmit the weather data to the data analysis server, wherein the weather data include a humidity, a wind speed and a rainfall; and the data analysis server being configured to determine an advection fog state between two said long range wireless base stations according to the received weather data and the radio signal strength indicator $RSSI_1$ of the radio signal transmitted and received between the two long range wireless base stations, wherein when the $RSSI_1$ is smaller than a forecasting threshold $RSSI_0$ and there is no rain in the forecasting region, it is determined that advection fog is present in an area of the forecasting region defined between two said long range wireless base stations, and an advection fog density is to be obtained;

in which the advection fog density is obtained using an equation of:

$$W=\{\overline{R}\cap(RSSI_1-RSSI_0)\}$$

where, R is the rainfall, and when R≠0, the advection fog density is 0; and when R=0, the advection fog density is W, or a difference between $RSSI_1$ and $RSSI_0$;

in which the forecasting threshold is determined using an evaluation model that $$RSSI_0=\alpha+Log_{based}d-Log_{basex}X-Log_{basey}Y$$

where α is an RSSI signal distance adjustment parameter; d is the distance between two said long range wireless base stations; based is a base for a logarithm of the distance between the long range wireless base stations in the forecasting region; basex is a base for a logarithm of an adjustment factor for the humidity in the forecasting region; X is a value of the humidity in the forecasting region, basey is a base for a logarithm of an adjustment factor for the wind speed in the forecasting region; and Y is a value of the wind speed in the forecasting region.

2. An advection fog forecasting method, comprising steps of:

Step 1. providing two or more long range wireless base stations in a forecasting region where advection fog forecast is required, wherein a distance between two adjacent said long range wireless base stations is of 5-100 km; and acquiring weather data in the forecasting region by means of a weather data port;

Step 2. making the long range wireless base stations collect a radio signal strength $RSSI_1$ of a radio signal transmitted therebetween and transmit the radio signal strength $RSSI_1$ to a data analysis server, and making the weather data port acquire a humidity, a wind speed, and a rainfall as the weather data, and transmit the weather data to the data analysis server; accumulating the radio signal strength $RSSI_1$ and the weather data for more than 30 days as an accumulated dataset, and when there are 5-8 times of presence of advection fog in the forecasting region, analyzing the accumulated dataset, in order to determine parameters including α, based, basex, and basey for an evaluation model of a forecasting threshold $RSSI_0$, thereby determining the evaluation model of $RSSI_0$;

in which the evaluation model of the forecasting threshold $RSSI_0$ is determined according to $RSSI_1$, the weather data and the presence of advection fog, and is represented as:

$$RSSI_0=\alpha+Log_{based}d-Log_{basex}X-Log_{basey}Y$$

where α is an RSSI signal distance adjustment parameter;

d is the distance between two said long range wireless base stations;

based is a base for a logarithm of the distance between the long range wireless base stations in the forecasting region; basex is a base for a logarithm of an adjustment factor for the humidity in the forecasting region;

X is a value of the humidity in the forecasting region;

basey is a base for a logarithm of an adjustment factor for the wind speed in the forecasting region; and Y is a value of the wind speed in the forecasting region; and Step 3. forecasting advection fog;

making the long range wireless base stations acquiring the radio signal strength $RSSI_1$ of the actually received radio signal, and transmit the weather data to the data analysis server; and making the weather data port acquire the humidity, the wind speed, and the rainfall in the forecasting region, and transmit the weather data to the data analysis server;

according to the radio signal strength $RSSI_1$ of the actually received radio signal, the weather data and the forecasting threshold $RSSI_0$, obtaining an advection fog density using an equation of:

$$W=\{\overline{R}\cap RSSI_1-RSSI_0)\}$$

where, R is the rainfall, and when R≠0, the advection fog density is 0;

when R=0, the advection fog density is W, or a difference between $RSSI_1$ and $RSSI_0$; and when a value of the rainfall is equal to 0 and $RSSI_1$ is smaller than $RSSI_0$, determining that advection fog is present in an area of the forecasting region defined between two said long range wireless base stations with the advection fog density being of W.

* * * * *